US 8,010,242 B1

(12) United States Patent
Ginsberg et al.

(10) Patent No.: US 8,010,242 B1
(45) Date of Patent: Aug. 30, 2011

(54) FLIGHT PLANNING SYSTEM AND METHOD

(75) Inventors: Matthew L. Ginsberg, Eugene, OR (US); Aran Clauson, Eugene, OR (US)

(73) Assignee: On Time Systems, Inc., Eugene, OR (US)

( * ) Notice: Subject to any disclaimer, the term of this patent is extended or adjusted under 35 U.S.C. 154(b) by 364 days.

(21) Appl. No.: 12/186,823

(22) Filed: Aug. 6, 2008

(51) Int. Cl.
*G05D 1/00* (2006.01)
(52) U.S. Cl. .............................. 701/3; 701/202; 73/65.05
(58) Field of Classification Search .............. 701/3, 123, 701/202, 4, 7, 10; 73/65.05, 65.06
See application file for complete search history.

(56) References Cited

U.S. PATENT DOCUMENTS

| | | | |
|---|---|---|---|
| 4,812,990 A | | 3/1989 | Adams et al. |
| 4,935,885 A * | | 6/1990 | McHale et al. ............... 702/175 |
| 5,343,388 A | | 8/1994 | Wedelin |
| 5,880,408 A | | 3/1999 | Schreiner |
| 6,134,500 A | | 10/2000 | Tang et al. |
| 6,289,277 B1 | | 9/2001 | Feyereisen et al. |
| 6,600,991 B1 | | 7/2003 | Jardin |
| 7,376,495 B2 * | | 5/2008 | Coggins et al. ................... 701/3 |
| 7,647,163 B2 * | | 1/2010 | Allen ............................. 701/123 |
| 7,797,102 B2 * | | 9/2010 | Fortier .......................... 701/206 |
| 2005/0116109 A1 * | | 6/2005 | Berard ...................... 244/135 A |
| 2006/0089760 A1 | | 4/2006 | Love et al. |
| 2007/0179703 A1 | | 8/2007 | Soussiel et al. |
| 2008/0312776 A1 * | | 12/2008 | Sylvester .......................... 701/3 |
| 2009/0109022 A1 * | | 4/2009 | Gangopadhyay et al. .... 340/540 |

FOREIGN PATENT DOCUMENTS

EP    1 595 789    * 11/2005

OTHER PUBLICATIONS

Hahn, A.S., "Staging Airline Service," American Institute of Aeronautics and Astronautics, 2007, pp. 1-16, [Online] [Retrieved on Feb. 18, 2009] Retrieved from the Internet<URL:http://ntrs.nasa.gov/archive/nasa/casi.ntrs.nasa.gov/20070032063_2007032029.pdf>.
Vankan, J. et al., "Multi-Objective Optimisation of Aircraft Range and Fuel Consumption," National Aerospace Laboratory NLR, 2007, Amsterdam, the Netherlands, [Online] Retrieved from the Internet<URL:http://www.vivaceproject.com/content/advanced/57Vankan.pdf>.
Waitz, I.A., "Unified Lecture #2: The Breguet Range Equation," Unified Engineering Lecture Outlines, Fall 2003, pp. 1-12.

* cited by examiner

*Primary Examiner* — Thomas G Black
*Assistant Examiner* — Marthe Marc Coleman
(74) *Attorney, Agent, or Firm* — Fenwick & West LLP

(57) ABSTRACT

A system and method for flight planning determines an optimal route by first assuming that the gross payload of a plane is used for fuel, determining legal routes based on to-capacity fueling, determining available payload for possible flight segments by removing unneeded fuel, selecting an optimal route for a desired payload, and minimizing fueling for the selected route.

12 Claims, 5 Drawing Sheets

FLIGHT PLANNING SYSTEM AND METHOD

GOVERNMENT LICENSE RIGHTS

The U.S. Government has a paid-up license in this invention and the right in limited circumstances to require the patent owner to license others on reasonable terms as provided for by the terms of contract V797(049A3G) P-068, subcontract S1002314 (Computer Sciences Corporation) awarded by the United States Air Force.

BACKGROUND

1. Field of Art

The present invention generally relates to flight planning for aircraft, and more specifically, to determining flight paths, payload, fuel and refueling parameters that optimize one or more desired considerations (e.g., fuel cost) for an aircraft voyage.

2. Description of the Related Art

Flight planning has been important to air travel since before the advent of fixed-wing aircraft. Determining the range of an aircraft to deliver a given payload, the fuel required for such a trip, the bearings and altitudes to be used are all critical considerations for safe and efficient air travel.

As fuel costs continue to rise and as concern about global climate change increases, a great amount of attention has been given in recent years to efficiency in air travel. Likewise, military applications look to efficiency, not only to minimize cost of operations but also to allow existing aircraft to transport greater payloads over longer distances. Efficiency also often translates into increased useful life for individual airframes and the ability to transport more cargo between aircraft overhauls.

For example, NASA has studied whether use of staged airline voyages, rather than long-haul trips, might lead to reduced emissions resulting from air travel. See Andrew S. Hahn, *Staging Airline Service*, American Institute of Aeronautics and Astronautics (2007), available at ntrs.nasa.gov/archive/nasa/casi.ntrs.nasa.gov/20070032063_2007032029.pdf. That paper addresses a number of analytical approaches for determining aircraft range, from the classic Breguet Range Equation to more recent approaches. Government agencies of other countries have likewise addressed similar issues. In J. Vankan, et al., *Multi-Objective Optimisation of Aircraft Range and Fuel Consumption*, National Aerospace Laboratory NLR (Amsterdam, the Netherlands, 2007), available at http://www.vivaceproject.com/content/advanced/57Vankan.pdf, various adjustments and corrections are applied to traditional Breguet range calculations in an attempt to achieve Pareto optimal improvements in aircraft design.

Central to many of these approaches is the recognition that an aircraft's range is based in part on its weight, which includes both the weight of the fuel it carries and of the static payload it is carrying. Recognition that a vehicle's payload capacity is related to the fuel it is carrying is not unique to aircraft; analysis of ships and land vehicles also recognizes the "fuel as payload" issue. See, e.g., U.S. Pat. No. 5,880,408 (to assignee-at-issue Caterpillar, Inc. and disclosing techniques for compensating for fuel weight in payload measurement system).

Vehicular payloads are typically static over time, in that the weight of the payload does not vary from the beginning of a voyage to the end. Fuel is an aspect of payload that is virtually unique in that it varies dramatically in weight during the voyage.

It has long been recognized that in aircraft, the varying weight of fuel is far too significant to be simply ignored, or even just averaged, in determining flight plans. Because fuel weight changes so dramatically over the course of a voyage, special computational techniques need to be used to account for the weight of fuel. In one simplistic approach, an iterative approach is used to gradually approach realistic estimation of flight characteristics such as range, endurance, and the like. Not only is such an approach inaccurate, it is computationally intensive and therefore either slow or expensive to use.

Another approach is described in U.S. Pat. No. 6,134,500 (to assignee-at-issue United Air Lines, Inc.), that uses "backward" search techniques that start by considering how much weight the plane is desired to have at the conclusion of a voyage from one point to another, and then works backward to determine how much weight it should have on descent, during cruise and finally on initial climb. Such backward processing simplifies the range of calculations needed to determine initial fuel loads and preferred airspeeds, altitudes and routing during flight.

Yet another approach to flight planning does not attempt to load enough fuel on the plane to clear all possible safety parameters for the journey from a worst-case perspective. Instead, a reasonably expected case is used for fuel loading calculations, and then divert locations are determined so that if conditions worse than expected arise, the aircraft can make an enroute determination to refuel using a "reclear" procedure. Thus, far less fuel needs to be carried than for the conventional worst-case planning technique. However, more accurate and computationally simple mechanisms than the conventional ones for determining fuel loading are still applicable to such improved approaches to flight planning.

In military applications, another factor to be considered is the availability of in-flight refueling. Such refueling allows aircraft to take off with lighter fuel loads (and therefore heavier static payloads) than would normally be possible, or to take off in shorter distances than would be possible with full fuel tanks Determining where and how often to refuel to minimize cost can have dramatic impacts on overall mission costs.

In spite of the long-understood need to consider fuel weight in flight planning, there remains a need for a computationally simple approach to help in determining factors such as flight path, fueling logistics and the like. No quantitative methods exist that permit simple yet efficient determination of such factors.

SUMMARY

As disclosed herein, an optimization system is used that simplifies flight planning by including an initial assumption that falsely assumes that the entire gross payload capacity of a plane is used for fuel to generate an initial set of routes.

In one embodiment, an initial set of legal routes is identified assuming that the plane is fueled to capacity, and a corresponding initial assumption of "to-capacity" refueling is made for all refueling nodes along the legal routes. Next, determination is made as to how much fuel could be removed at each node (i.e., the amount that is excess), starting at the first. Based on that determination, a usable payload capacity for the various legal routes is determined.

In one embodiment, parameters include refueling airfield locations, in-flight refueling locations, and emergency divert locations. In other embodiments, parameters include vehicle performance characteristics, wind speed, areas presenting weather concerns, areas presenting political concerns, and fuel management considerations (e.g., fuel more expensive in one refueling location than another).

In still other embodiments, planning for trips made using other types of vehicles and other conveyances such as ships, submarines, trains, trucks, spacecraft and the like is accomplished using the above considerations. Movement of humans by walking from one provisioning location to another is likewise benefited by such considerations.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description, when taken in conjunction with the accompanying drawings, in which.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of the claimed invention.

System Architecture

Figure 2:
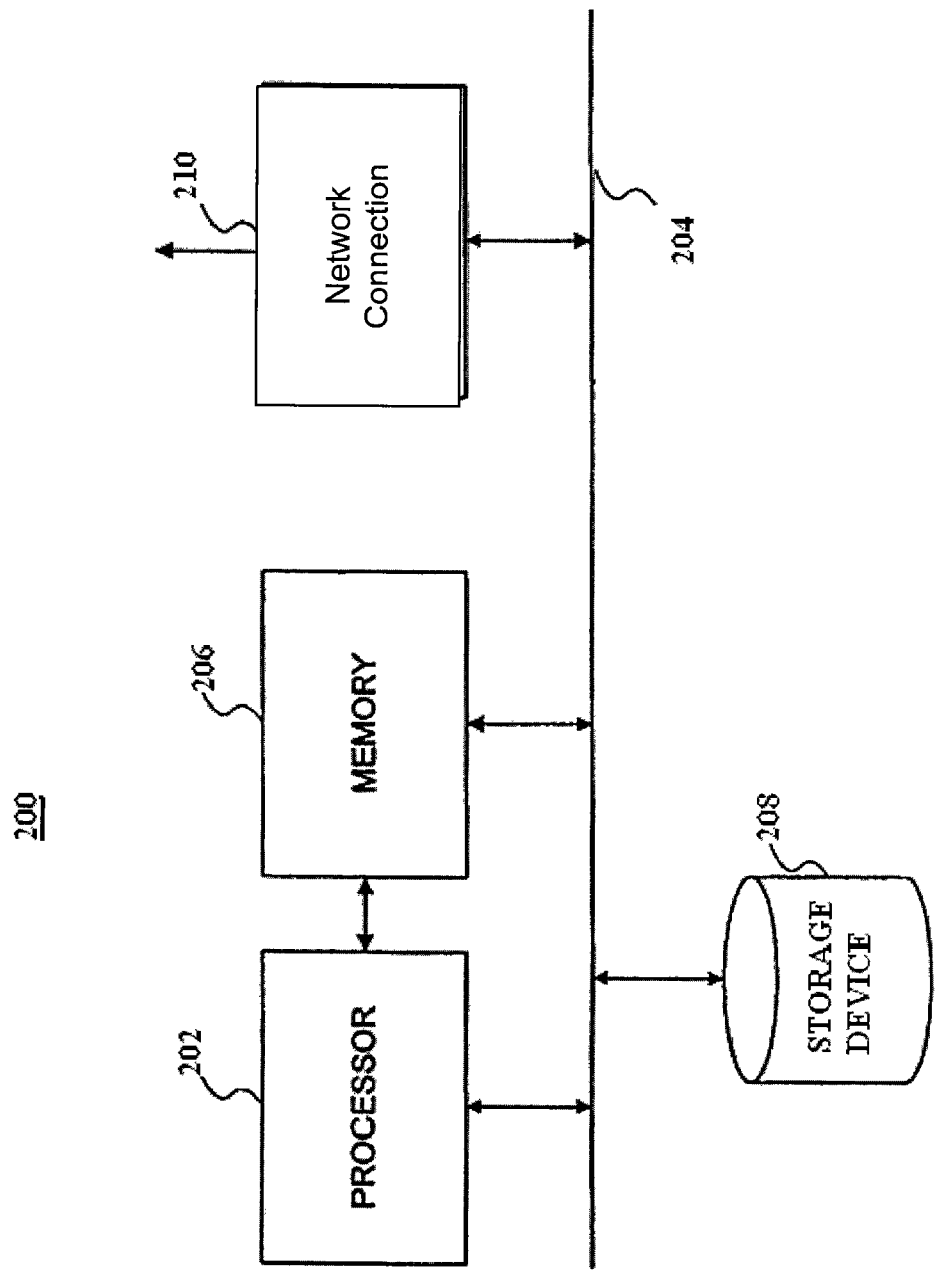
FIG. 2 is a high-level block diagram illustrating a computer system for implementing a preferred embodiment.

FIG. 2 is a high-level block diagram illustrating a computer system 200 for flight planning as described herein. In a preferred embodiment, a conventional computer programmed for operation as described herein is used to implement computer system 200. Processor 202 is conventionally coupled to memory 206 and bus 204. For applications in which higher performance is required, multiple processors 202 are employed. Also coupled to the bus 204 are memory 206, storage device 208, and network connection 210. For clarity of discussion, other system components such as a keyboard, graphics adapter, pointing device, and display are not separately illustrated.

In a typical embodiment, processor 202 is any general or specific purpose processor such as an INTEL Pentium compatible central processing unit (CPU), as applicable for the processing power required for any particular application. Storage device 208 is any device capable of holding large amounts of data, like a hard drive, compact disc read-only memory (CD-ROM), digital versatile disc (DVD), or combinations of such devices. Memory 206 holds instructions and data used by the processor 202. The pointing device, such as a mouse, track ball, light pen, touch-sensitive display, is used in combination with the keyboard to input data into the computer system 200. The graphics adapter displays images and other information on the display. The network connection 210 couples the computer system 200 to the user's network environment, such as a local or wide area network (not shown).

A program for flight planning according to one embodiment of the present invention is preferably stored on the storage device 208, loaded from memory 206, and executed on the processor 202. Alternatively, hardware or software modules are stored elsewhere within the computer system 200 for performing actions as described herein, or are accessed remotely via network connection 210.

The results of the program's operation are output to the display, and, as desired, to additional output devices and output formats (not shown), including, for example, printers, fax devices, and image or printer files. Additionally, if desired they are passed as input to other software processes, such as those for handling other aspects of flight management.

Exemplary Flight Planning Scenario

Figure 3:
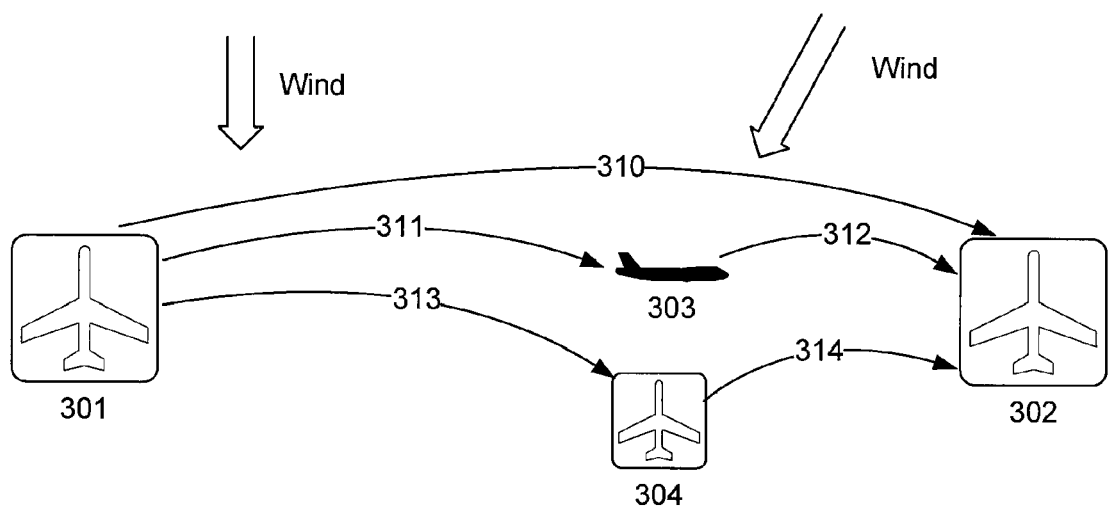
FIG. 3 depicts potential legal routes for a particular flight from one location to another, showing exemplary issues to be considered in flight planning, according to one embodiment.

Referring now to FIG. 3, consider airport 301 to be a starting airport and airport 302 to be a destination airport. A flight plan for delivery of a payload from airport 301 to airport 302 is generated, in a preferred embodiment, based on a variety of factors. In some situations, a flight path may be largely unconstrained, while in others, significant constraints may limit "legal" paths to a relatively small number of options. In many areas in the world that exhibit flight congestion, only set paths (including not only latitude/longitude coordinates but altitudes as well) are available for air travel. Likewise, political considerations relating to a possible flyover country may prevent a pilot from using a path that would otherwise be considered optimal.

Safety considerations sometimes present other constraints. For example, some planes are not rated for certain over-water operations and must remain within a specified maximum distance from locations suitable for emergency landings (e.g., according to conventional ETOPS rules). Often, planes are required to maintain sufficient fuel at all times to make it to identified "divert" landing locations in adverse conditions such as headwinds and must not choose flight paths that will put them beyond range from such a divert location.

Fuel cost imposes still another constraint, and this constraint may be correlated in some way with other factors, such as wind direction and strength. For instance, FIG. 3 illustrates a situation in which wind at the beginning of the trip is different in both direction and intensity than near the destination. To give a rather complicated but common situation, the cost of fuel at airfield 304 may be so much higher than at airfield 301 that, in certain wind conditions, it justifies carrying more fuel than would otherwise be needed on segment 313 so as to call for a smaller purchase of fuel at airfield 304 to complete the journey via segment 314.

For longer journeys, particularly those involving delivery of heavy payloads, refueling may be a consideration. Of the three "legal" (i.e., feasible based on the factors under consideration) flight paths shown in FIG. 3, only the one illustrated at the top (segment 310) does not contemplate refueling. The lowest one (including segments 313 and 314) shows a stop at an intermediate airfield 304, and the middle one (including segments 311 and 312) shows an in-flight refueling via a tanker aircraft 303. There may be other considerations calling for the flight path to include certain waypoints, all of which may contribute to whether a particular path is considered legal.

Method of Operation

Figure 4:
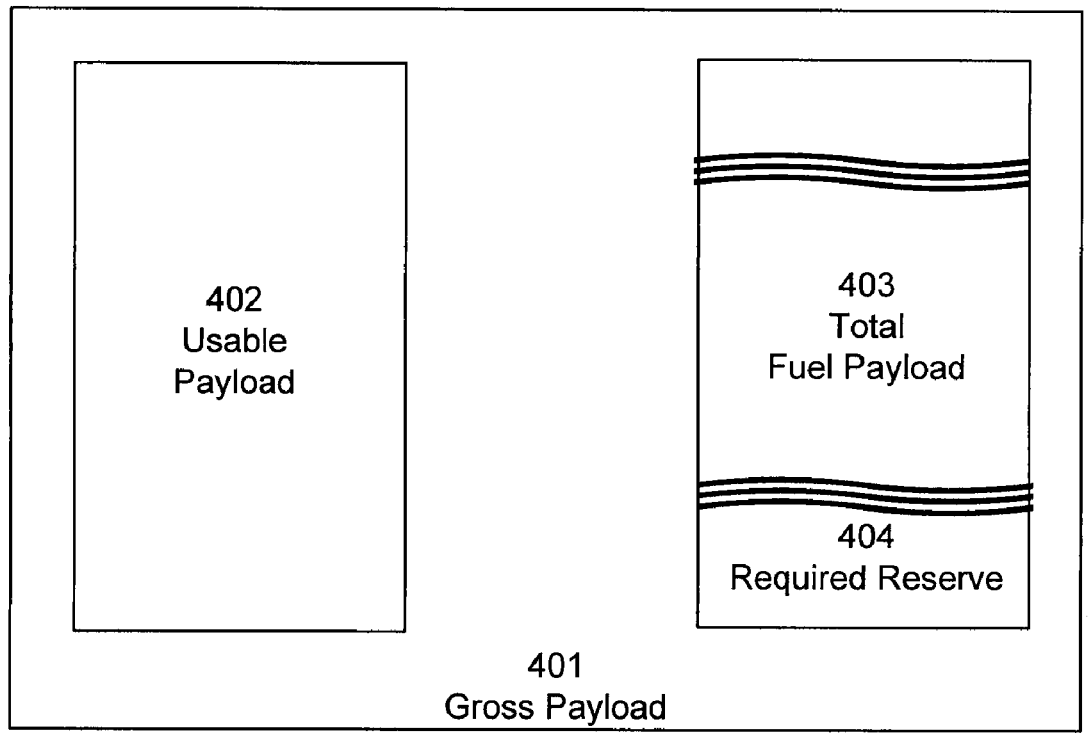
FIG. 4 depicts overall gross payload of a vehicle as considered according to one embodiment.

As shown in FIG. 4, the gross payload of an airplane 401 can be considered to consist of the sum of the total fuel payload 403 (which includes a required fuel reserve 404) and a usable payload 402. Generally, the overall goal for a mission is to move a particular payload from one place to another, and thus conventional techniques often focus on usable payload 402 for flight planning purposes. However, in a preferred embodiment it is shown to be desirable to ignore usable payload 402 at the outset and focus instead on gross payload 401.

Figure 1:
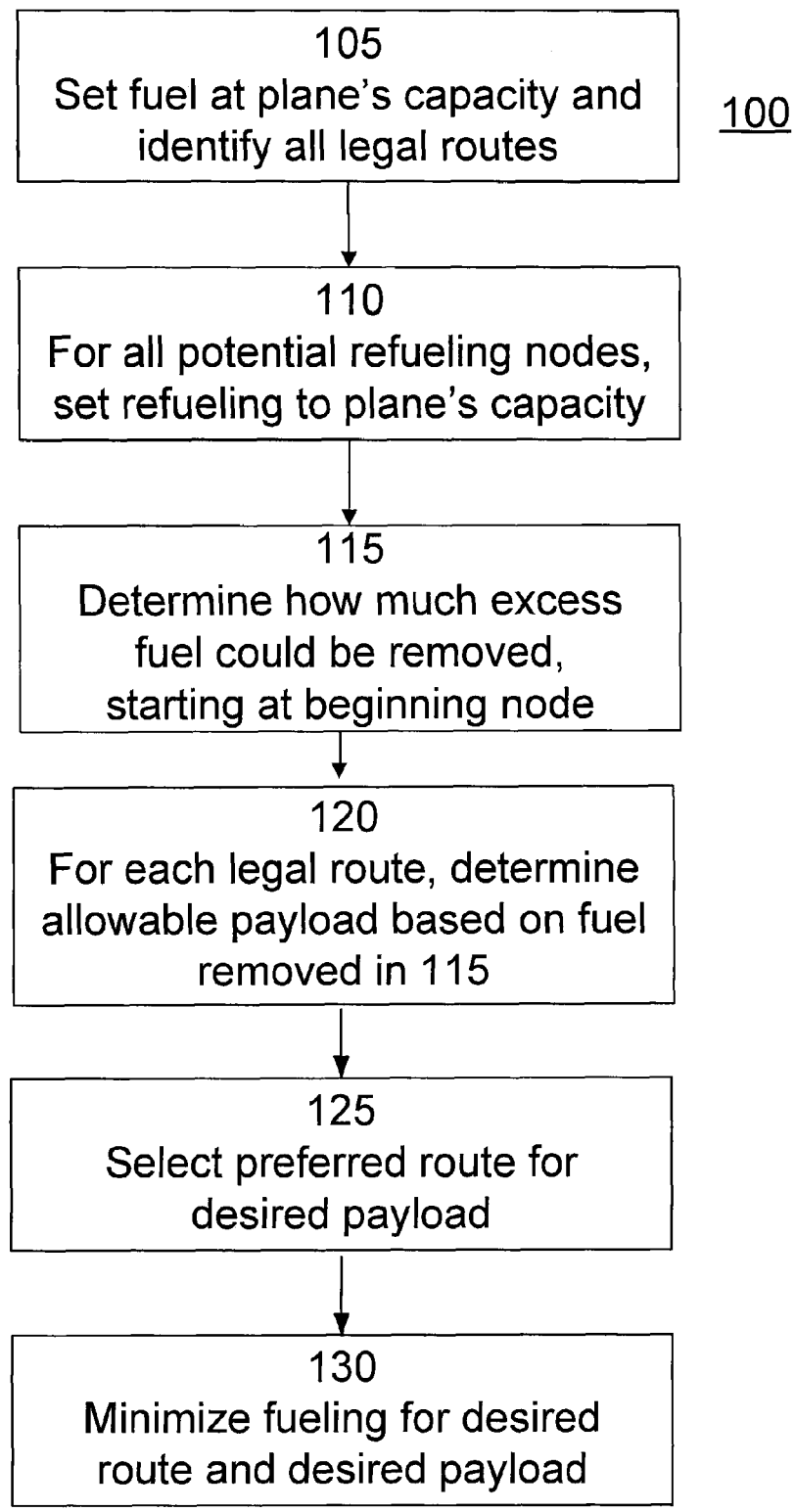
FIG. 1 is a flowchart indicating the high-level steps performed for flight planning, according to one embodiment.

FIG. 1 illustrates, in flowchart form, one example of a method 100 to accomplish flight planning, according to a preferred embodiment.

At the outset, an initial assumption is made that the plane will be fueled to the gross payload capacity 401, as opposed to setting its total fuel payload 403 to capacity. Such gross payload capacity could not actually be used for fuel, as only part of that capacity is in fuel tankage (total fuel payload 403) as opposed to, for instance, container space for usable payload 402. However, this assumption greatly simplifies analysis at the outset and is reconciled with actual fuel payload capacity at a later stage. Using this assumption, a set of "legal" routes is determined 105 from a starting airfield, e.g., airport 301, to a destination airfield, e.g., 302. Taking the example shown in FIG. 3, there may be three such routes: one direct without refueling, another with midair refueling and a third with a refueling stop at airport 304. In actual practice, and particularly for long-haul routes, there may be many more legal routes, and those may differ due to any of the factors discussed above. To give an example, FIG. 3 illustrates a situation in which there is a cross-wind over much of the journey, with only a minor headwind component near the destination. Were conditions different, e.g., a strong headwind expected over the entire path, the non-stop flight without refueling (310) might not be considered a legal route. Conventional flight planning products and services, such as those provided by the Jeppesen subsidiary of Boeing Commercial Aviation Services, are used to determine such legal routes.

Some such legal routes as determined in 105 may include refueling. In a preferred embodiment, for each potential refueling waypoint (such as at tanker 303 or airport 304), an initial assumption is made that such refueling is done to the airplane's full gross payload capacity 110.

Based on the settings from 105 and 110, determinations are made 115 as to how much fuel is excess, i.e., how much could be removed from the airplane while maintaining the path as legal, for instance by ensuring at least a required fuel reserve 404 remains at the end of each flown segment, e.g., 313. More specifically, after the initial assumption 110, an amount of fuel that could be removed from such assumed full capacity and yet still permit travel to the end of the first segment, e.g., 313 is determined. The same process is then repeated to determine how much fuel could be removed at refueling airport 304 yet still permit segment 314 to be flown.

Finally, an allowable usable payload 402 is determined 120 for each of the legal routes considered. The allowable payload is the maximum payload that maintains at least the required fuel reserve 404 based on the determination of excess fuel (i.e., the removed fuel 115) at the end of each flown segment of a route. The allowable payload for each segment is then simply the excess fuel.

In some instances, the amount of excess fuel removed may indicate that the segment is not, in fact, valid for flight. For example, a small amount of excess fuel may indicate, by subtraction of that excess from the gross payload, that while the plane can carry the weight of the fuel for the segment, it does not have the tankage to carry all of it as usable fuel. Thus, without a retrofit to increase tankage, the segment cannot be flown and the route using such segment is eliminated from further consideration. This determination, which is computationally quite simple, permits usage of the initial assumption at 105 that the plane's entire gross payload could be used for fuel. For further efficiency, once one segment of a route is determined to not be viable, the entire route is eliminated from consideration and allowable payloads for other segments are never computed unless they happen to be segments used for other routes, as well.

The maximum usable payload for each remaining legal route is then given as the minimum of the usable payloads determined for each segment of that route. If the actual payload desired for the flight is variable, assuming that moving the greatest payload to the destination on a single flight is a priority, the route allowing the greatest usable payload is the one chosen. Thus, this method allows determination of the maximum payload that the aircraft can fly for any particular legal route. If a routing is already known as a given, by manually identifying only that route as legal in 105, the determination in 120 will provide the maximum possible payload.

In other situations, payloads may be of predetermined amounts (e.g., one platoon's materiel) so the preferred route may be the one that minimizes fuel used or, correspondingly, overall travel time. Using again the example of FIG. 3, it may be that the usable payload for route 310 is determined to be less than the required payload based on 120, so that it is not, after all, a legal route. In that instance, the route using mid-air refueling (segments 311, 312) may be selected 125 as preferred, assuming that the monetary cost of mid-air refueling is considered less important than the time cost of diverting to refueling airport 304. In practice, whether mid-air refueling is indeed preferable to refueling at airport 304 may depend on a number of factors, including the distance tanker 303 needs to fly to be in place for refueling, how out of the way airport 304 is from a direct path between airports 301 and 302, etc. A number of factors, ranging from conventional "cost of fuel, delivered" analysis to the perceived safety of mid-air refueling, are also appropriately included as particular situations may warrant.

After the route to be flown is selected, the actual fueling requirements for each route are determined 130 based on conventional flight planning techniques, e.g., removal of fuel from total fuel payload 403 so as to leave only the required reserve 404 at the next refueling waypoint or destination, as applicable.

Figure 5:
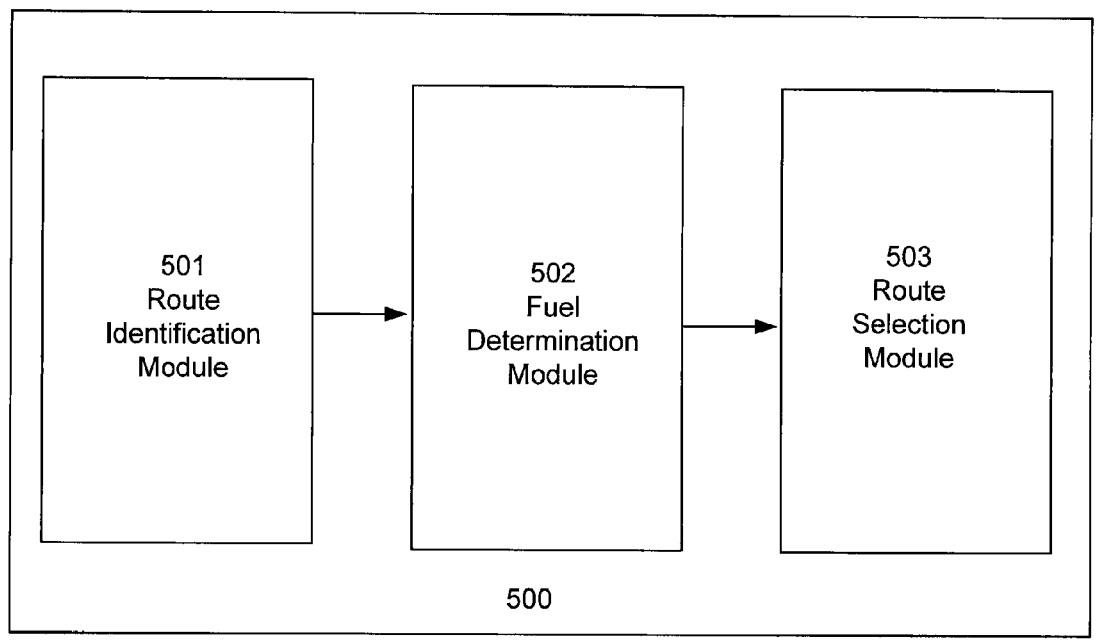
FIG. 5 depicts modules for implementing a system according to one embodiment.

Referring now to FIG. 5, an exemplary system 500 to determine fuel and payload parameters according to the method discussed above includes a route identification module 501, a fuel determination module 502 and a route selection module 503. Each of these modules is preferably implemented in the computer system 200 referenced above. Route identification module 501 determines potential legal routes as detailed above in connection with FIG. 1. Fuel determination module 502 determines, for each segment of each such route, the minimum fuel required by using the initial assumption of fueling to gross payload capacity 401 as previously described. Based on these requirements, route selection module 503 then chooses a preferred route and, for that route, provides as output usable payload information as well as fueling requirements at the start and at each fueling waypoint.

One of skill in the art will realize that the invention is not limited to flight planning for aircraft, but could equally well be applied to any other effort that requires costly or limited resources, such as movement of troops based on limited locations at which food and water are available.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, the words "a" or "an" are employed to describe elements and components of the invention. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a method for flight planning and, more generally, other efforts that require costly or limited resources in a similar manner. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method of determining loading of a vehicle for a trip having a start point and an end point, wherein the vehicle has a gross payload capacity including a total fuel capacity and a usable payload capacity, the method comprising:
    determining valid routes from the start point to the end point responsive to the vehicle having sufficient fuel range for such routes assuming an amount of fuel equal to the gross payload capacity;
    for each valid route, determining an amount of fuel that can be removed from the vehicle at the start point such that the vehicle has a minimum allowable amount of fuel at the end point;
    determining allowable payload for each valid route in response to said determining an amount of fuel that can be removed for such route;
    selecting from the valid routes a preferred route; and
    determining loading of the vehicle with fuel and a payload responsive to said determining an amount of fuel and said determining allowable payload.

2. The method as in claim 1, at least one of the valid routes including a fueling waypoint, wherein determining valid routes further includes assuming refueling at the waypoint so that vehicle has an amount of fuel at the waypoint equal to the gross payload capacity.

3. The method as in claim 1, at least one of the valid routes including a fueling waypoint, further comprising determining an amount of fuel that can be removed from the vehicle at the fueling waypoint.

4. The method as in claim 1, wherein determining allowable payload for each valid route includes subtracting from the gross payload capacity the maximum amount of fuel needed to be carried at any point on such route.

5. The method as in claim 1, further comprising removing from consideration any route responsive to the amount of fuel that can be removed corresponding to determination that the vehicle would need to carry, at any point of said route, an amount of fuel greater than the total fuel capacity.

6. A computer program product for use in conjunction with a computer system to facilitate loading a vehicle for a trip having a start point and an end point, wherein the vehicle has a gross payload capacity including a total fuel capacity and a usable payload capacity, the computer program product comprising a computer readable storage medium and a computer program mechanism embedded therein, the computer program mechanism comprising:
    instructions for determining valid routes from the start point to the end point responsive to the vehicle having sufficient fuel range for such routes assuming an amount of fuel equal to the gross payload capacity;
    instructions for determining, for each valid route, an amount of fuel that can be removed from the vehicle at the start point such that the vehicle has a minimum allowable amount of fuel at the end point;
    instructions for determining allowable payload for each valid route in response to said determining an amount of fuel that can be removed for such route;
    instructions for selecting from the valid routes a preferred route; and
    instructions for providing parameters for loading the vehicle with fuel and a payload responsive to said determining an amount of fuel and said determining allowable payload.

7. A computer program product as in claim 6, at least one of the valid routes including a fueling waypoint, wherein determining valid routes further includes assuming refueling at the waypoint so that vehicle has an amount of fuel at the waypoint equal to the gross payload capacity.

8. A computer program product as in claim 6, at least one of the valid routes including a fueling waypoint, further comprising determining an amount of fuel that can be removed from the vehicle at the fueling waypoint.

9. A computer program product as in claim 6, wherein determining allowable payload for each valid route includes subtracting from the gross payload capacity the maximum amount of fuel needed to be carried at any point on such route.

10. A computer program product as in claim 6, further comprising removing from consideration any route responsive to the amount of fuel that can be removed corresponding to determination that the vehicle would need to carry, at any point of said route, an amount of fuel greater than the total fuel capacity.

11. A system for loading a vehicle having a gross payload capacity including a fuel payload capacity, comprising
    a route identification module adapted to determine potentially valid routes;
    a fuel determination module operatively coupled to the route identification module and adapted to reduce, from an initial assumption of fueling to the vehicle to the gross payload capacity, minimum permissible fueling requirements for each of the potentially valid routes; and
    a route selection module operatively coupled to the fuel determination module and adapted to provide as output a final route, a fuel schedule, and a payload parameter determination, responsive to the minimum permissive fueling requirements.

12. The system of claim 11, wherein the valid routes include fueling waypoints and the initial assumption of fueling includes fueling the vehicle to the gross payload capacity at each of said waypoints, the fuel determination module further configured to produce a subset of the permissible fueling requirements for each of the fueling waypoints.

* * * * *